O. S. Freeland,

Nut Lock.

No. 100,023.                    Patented Feb. 22. 1870.

Witnesses:
A. W. Almqvist
Edgar Tate

Inventor:
O. S. Freeland
Per Munn & Co.
Attorneys.

United States Patent Office.

OSWALD S. FREELAND, OF NEWPORT, RHODE ISLAND.

Letters Patent No.100,023, dated February 22, 1870.

IMPROVEMENT IN NUT-LOCK.

The Schedule referred to in these Letters Patent and making part of the same.

*To all whom it may concern:*

Be it known that I, OSWALD S. FREELAND, of Newport, in the county of Newport, and State of Rhode Island, have invented a new and useful Improvement in Lock-Nuts; and I do hereby declare that the following is a full, clear, and exact description thereof, which will enable others skilled in the art to make and use the same, reference being had to the accompanying drawings forming part of this specification, in which—

Similar letters of reference indicate corresponding parts.

My invention has for its object to furnish a simple, convenient, and effective lock-nut for bolts upon machinery, and in other places where they will be exposed to jarring, to prevent the said nuts from being worked off or loose by said jarring; and It consists in the construction and combination of various parts of the nut, as hereinafter more fully described.

A is the nut, which is made in three parts, the two outer parts being formed with screw-threads fitting into the threads of the bolt B.

Figure 1:
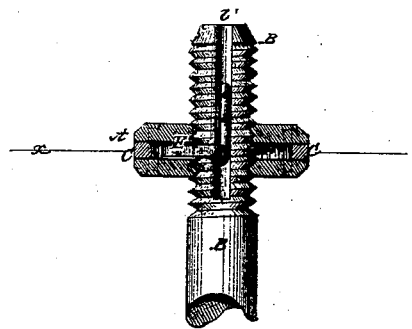
Figure 1 is a side view of a bolt to which my improvement has been attached, partly in section through the nut.
Figure 2:
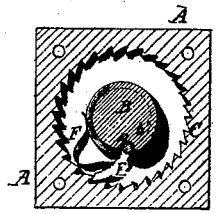
Figure 2 is a detail sectional view of the same taken through the line $x\ x$, fig. 1.

The inner diameter of the central part of the nut is made considerably larger than that of the outer parts, so that there may be a space left between the said part and the bolt B, as shown in figs. 1 and 2.

Upon the inner surface of the central part are formed a series of ratchet teeth, C, as shown in fig. 2.

D is a short stem placed in a groove, $b'$, formed for its reception in the side of the bolt B, as shown in figs. 1 and 2.

To the inner end of the stem D is rigidly attached a pawl, E, of such a length that when turned into the proper position it may engage with the teeth C, and thus prevent the nut from being turned off.

The pawl E is held in contact with the teeth C by the spring F, one end of which is attached to the pawl E, and its other end rests against the side of the bolt B at a distance of about one-third of the circumference of the said bolt from the groove $b'$ formed in its side.

In the other end of the stem D is formed a hole to receive the point of an awl or other suitable tool, to slightly turn it to withdraw the pawl E from the teeth C and allow the nut to be turned off.

When the nut is detached from the bolt the pawl E and spring F may be readily placed in and removed from the cavity of the nut.

When starting the nut upon the bolt, the stem D should be held in the groove $b'$ until the nut has been turned around once or twice, so that the stem D may not get between the threads of the bolt and nut and bind.

The nut A may be made in two or three pieces, as may be desired, but I prefer to make it in three for convenience in forming the teeth C.

When finished, the parts or pieces of the nut A may be securely and permanently bolted or riveted together.

Having thus described my invention,

I claim as new, and desire to secure by Letters Patent—

1. The nut A, having rachet teeth C formed upon the inner surface of its recessed middle part, substantially as herein shown and described, and for the purpose set forth.

2. The stem D, pawl E, and spring F, in combination with the grooved bolt B and nut A, constructed substantially as herein shown and described, and for the purpose set forth.

OSWALD S. FREELAND.

Witnesses:
CHARLES N. TILLEY,
JOHN HENRY TILLEY.